US006367896B1

(12) United States Patent
Peng et al.

(10) Patent No.: US 6,367,896 B1
(45) Date of Patent: Apr. 9, 2002

(54) COMPUTER ENCLOSURE WITH RELEASABLE INTERLOCKING MECHANISM BETWEEN COVER AND CHASSIS

(75) Inventors: Wen Tang Peng, Fullerton; Tim Lau, Fremont, both of CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/589,572

(22) Filed: Jun. 7, 2000

(51) Int. Cl.[7] .............................................. A47B 81/00
(52) U.S. Cl. ...................... 312/223.2; 312/222; 292/80
(58) Field of Search ........................... 312/223.1, 223.2, 312/222, 293.2, 290, 300, 111, 265.6; 361/683, 684, 724, 725, 726, 727; 292/19, 80, 81, 83, 86, 152, DIG. 37; 220/323, 324, 780, 782, 786

(56) References Cited

U.S. PATENT DOCUMENTS

| 5,197,789 A | * | 3/1993 | Lin | 312/223.2 |
| 5,348,356 A | * | 9/1994 | Moulton | 292/80 |
| 5,577,779 A | * | 11/1996 | Dangel | 292/80 |
| 5,743,606 A | * | 4/1998 | Scholder | 312/223.2 |
| 5,918,956 A | * | 7/1999 | Scholder | 312/223.2 |
| 5,971,507 A | * | 10/1999 | Peroni | 312/223.2 |
| 6,074,028 A | * | 6/2000 | Ho | 312/223.2 |

* cited by examiner

Primary Examiner—James O. Hansen
(74) Attorney, Agent, or Firm—Wei Te Chung

(57) ABSTRACT

A computer enclosure for enclosing electrical devices comprises a chassis having a bottom panel and a pair of side panels with a reduced height portion adjacent to a rear panel. The rear panel includes a wing fixedly attached to the reduced height portion and is coplanar to the side panel. The reduced height portion defines a recess. A spring latch extends downward and outward from the wing portion of the rear panel. A cover is detachably assembled to the chassis having a top panel and a pair of side panels corresponding to the side panels of the chassis. The cover includes a latch plate received in the recessed portion of the reduced height portion and engaged with the spring latch and a hook is interlocked to a planar portion of the reduced height portion when the cover is assembled to the chassis.

8 Claims, 6 Drawing Sheets

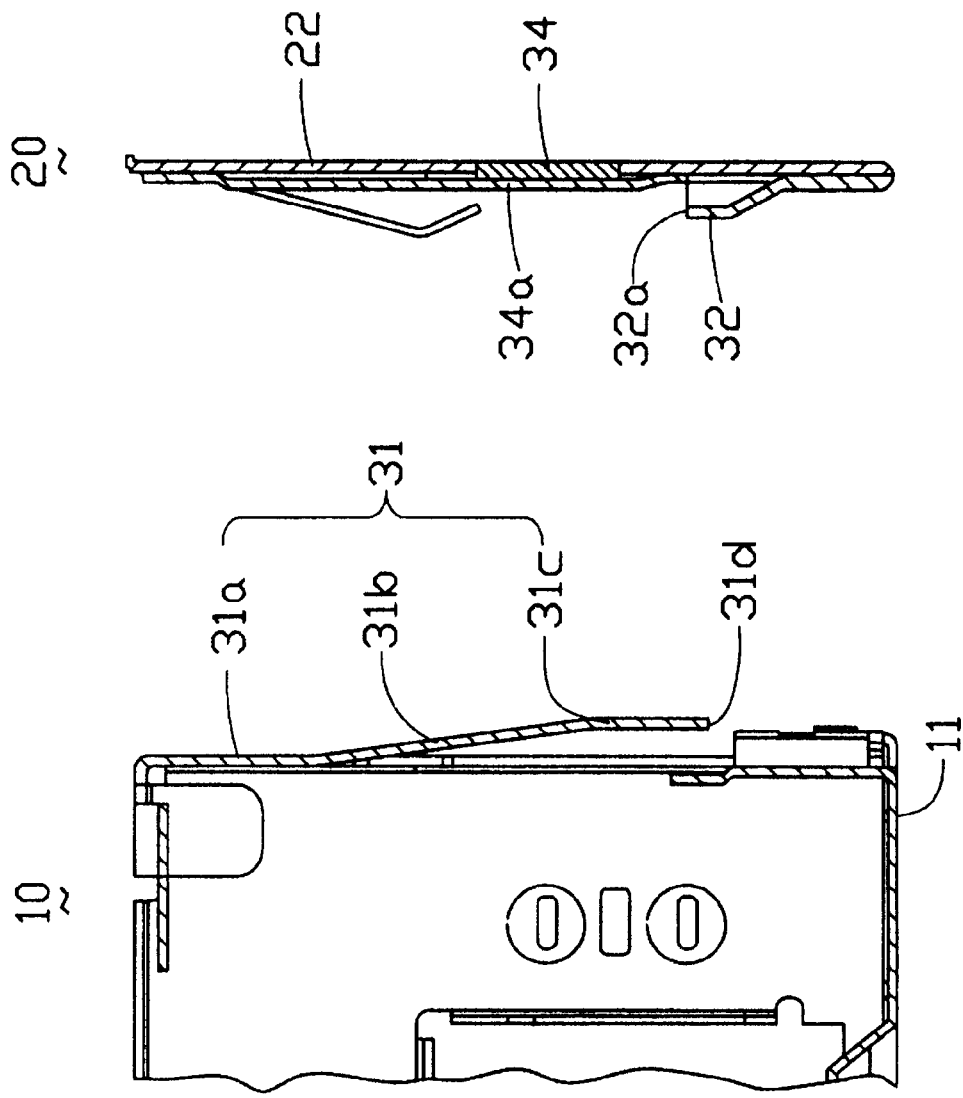

US 6,367,896 B1

COMPUTER ENCLOSURE WITH RELEASABLE INTERLOCKING MECHANISM BETWEEN COVER AND CHASSIS

FIELD OF THE INVENTION

The present invention relates to an interlocking mechanism, and more particularly to a computer enclosure interlocking mechanism by which a cover of the enclosure can be conveniently interlocked to and released from a chassis of the enclosure.

DESCRIPTION OF THE PRIOR ART

Personal computers are now part of our daily life. Our modem society is closely linked to computer on which a variety of data are processed, linked and interchanged. The computer generally comprises an enclosure configured by an enclosure and a cover assembled thereto, and a bezel which is attached to a front panel of the enclosure. The enclosure is used to carry a plurality of components which jointly configure the computer.

Generally, the cover is assembled to the chassis by screws and which takes time in assembly and disassembly. This inevitably increases the manufacturing cost. In addition, screws or the equivalents are also parts of inventory which should be carefully monitored in order to prevent a shut-down of the production line. Understandably, some attempts have been taken to introduce the snapping type enclosure by using less screws. Anyhow, forming recessions or hooks on the panels for mutually fastening complicates the corresponding manufacturing and sometimes results in unnecessary gap therebetween. The object of the invention is to provide an enclosure with the associated snap-in chassis and cover which is easy to be made with a compact structure thereof.

SUMMARY OF THE INVENTION

An object of this invention is to provide a computer enclosure in which an interlocking mechanism is provided to facilitate engagement and disengagement between cover and chassis of the enclosure.

Another object of this invention is to provide a computer enclosure in which the interlocking mechanism is arranged such that side panels of the cover and the chassis can be closely arranged to prevent EMI leakage from the enclosure.

In order to achieve the objects set forth, a computer enclosure for enclosing electrical devices therein comprises a chassis having a bottom panel and a pair of side panels with a reduced height portion adjacent to a rear panel thereof. The rear panel includes a wing fixedly attached with the reduced height portion and is coplanar to the side panel. The reduced height portion defines a recess therein. A spring latch extends downward and outward from the wing portion of the rear panel. A cover is detachably assembled to the chassis having a top panel and a pair of side panels corresponding to the side panels of the chassis. The cover includes a block received in the recess and engaged with the spring latch. when the cover is assembled to the chassis.

According to an aspect of the present invention, the cover her includes a hook interlocked to the reduced height portion.

These and additional objects, features, and advantages of the present invention will become apparent after reading the following detailed description of the preferred embodiment of the invention taken in conjunction with the appended drawings.

BRIEF DESCRIPTION OF THE DRAWINGS

FIG. 4 is a cross sectional view taken along line 4—4 of FIG. 1;

FIG. 5 is a cross sectional view taken along line 5—5 of FIG. 1; and

DETAILED DESCRIPTION OF PREFERRED EMBODIMENT

Figure 1:
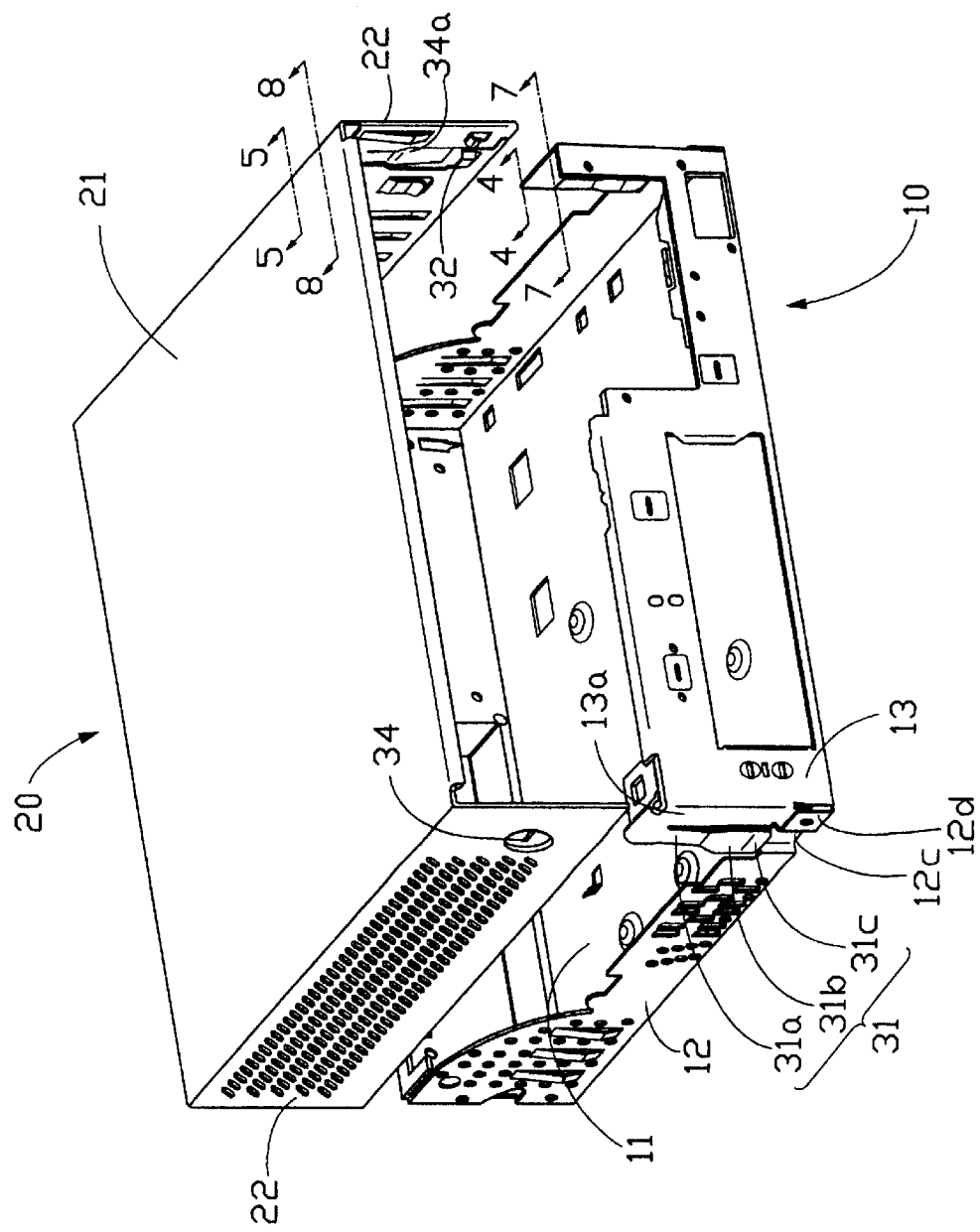
FIG. 1 is a perspective view of a computer enclosure in accordance with the present invention in which a cover and a chassis are separated from each other.
Figure 2:
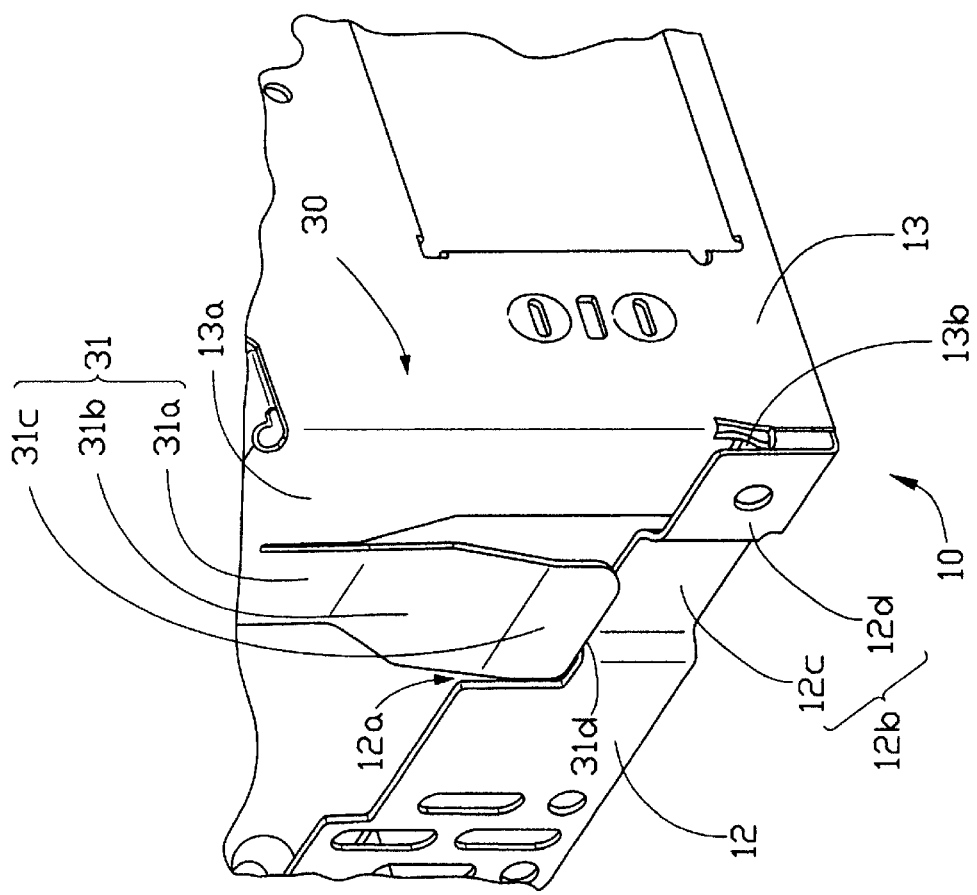
FIG. 2 is an enlarged portion of a spring latch in the chassis.
Figure 3:
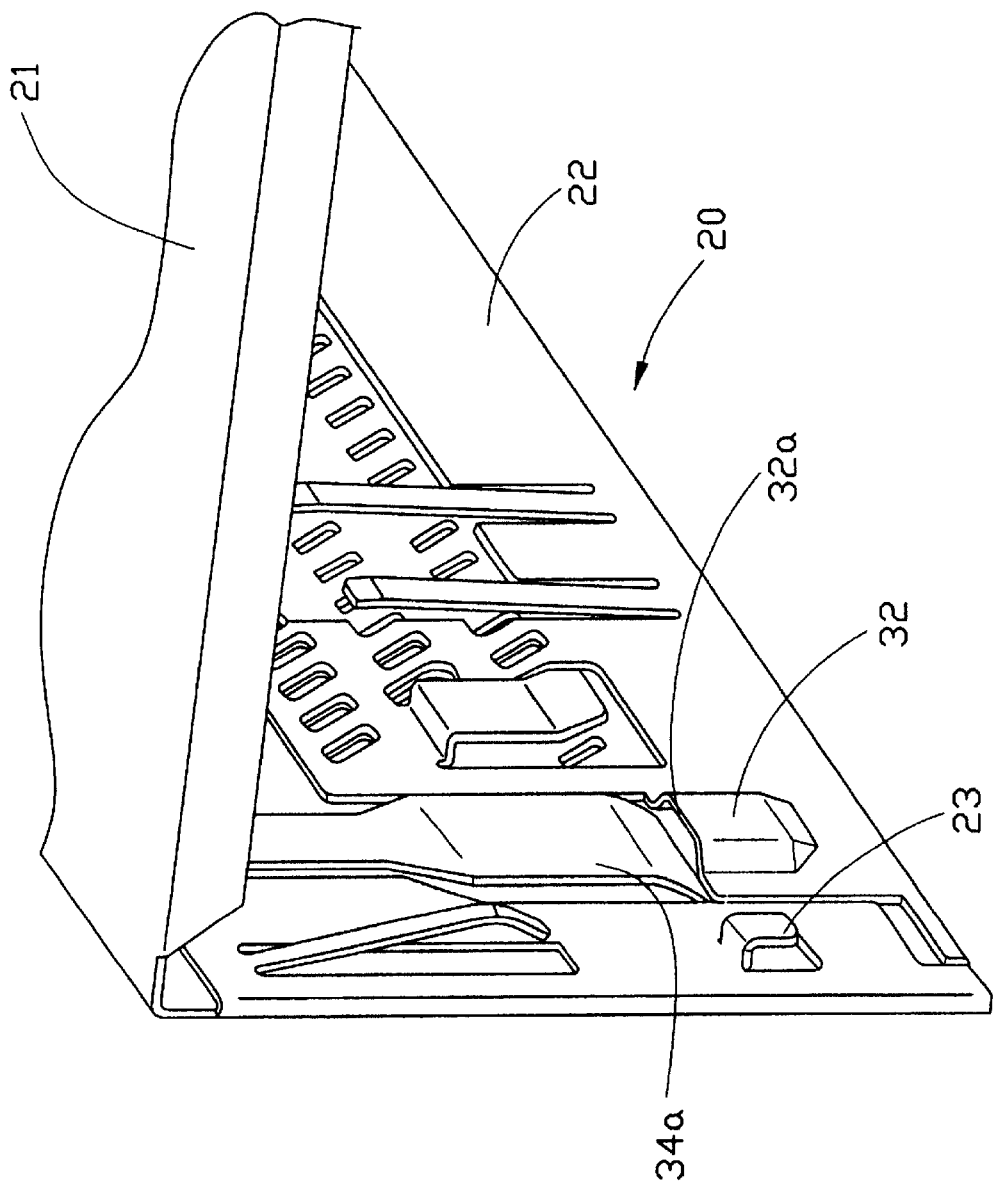
FIG. 3 is an enlarged portion of a block in the cover.
Figure 6:
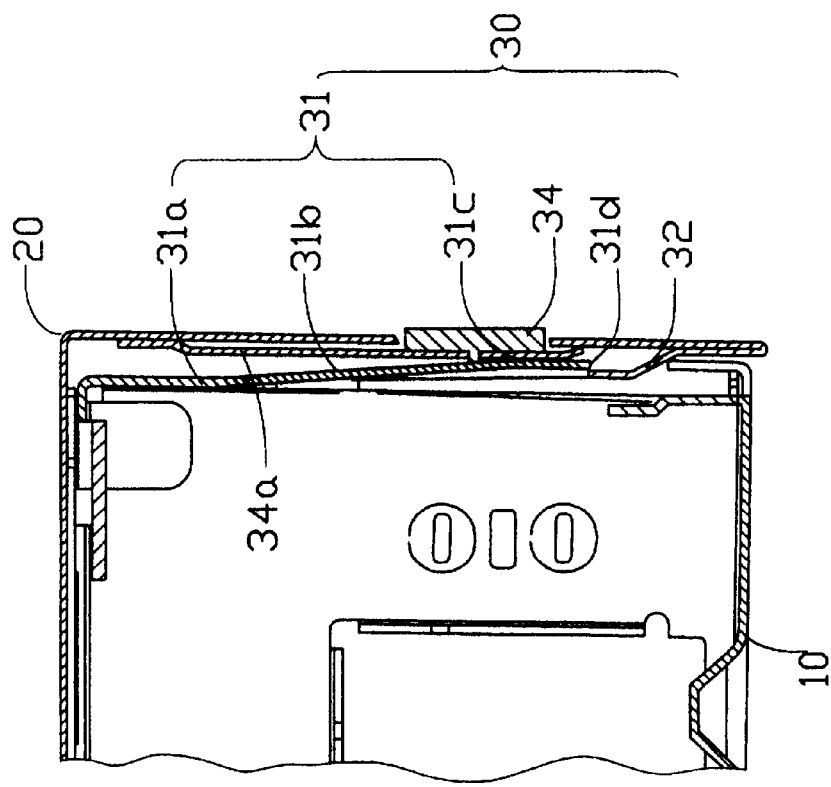
FIG. 6 is a cross section view showing engagement between the spring latch and the block.
Figure 9:
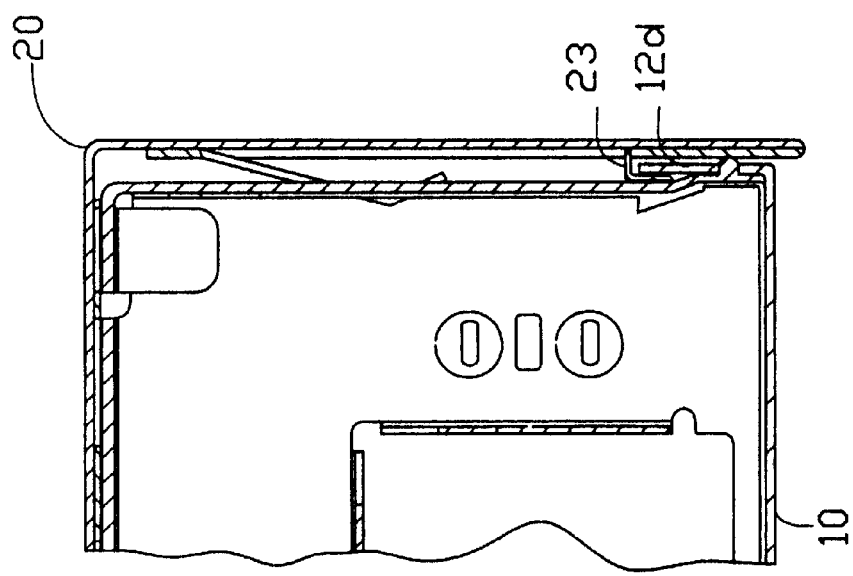
FIG. 9 is a cross sectional view showing engagement between a hook of the cover and a reduced height portion of the chassis.
Figure 8:
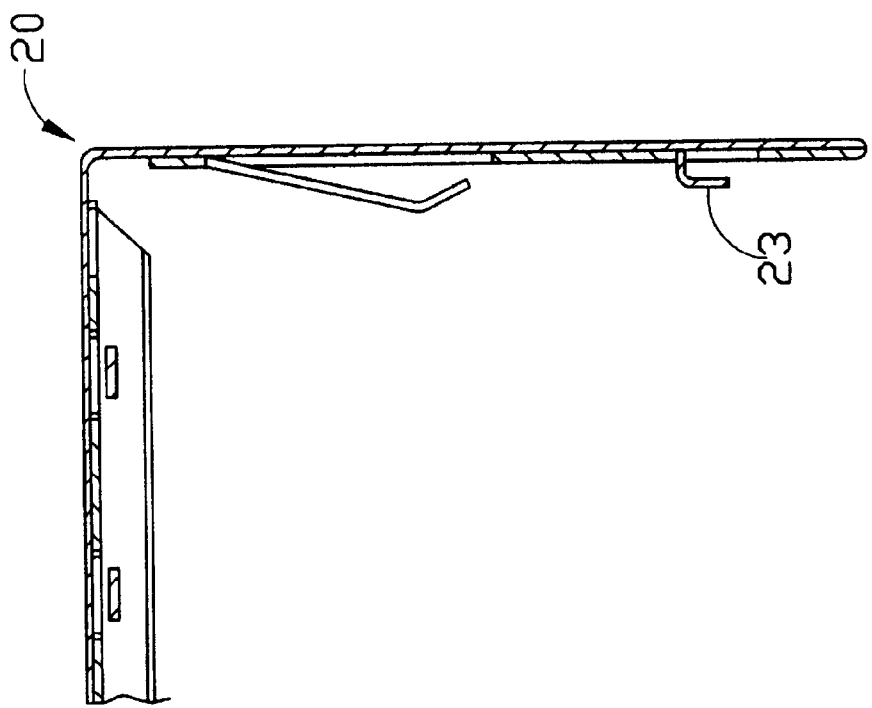
FIG. 8 is a cross sectional view taken along line 8—8 of FIG. 1.
Figure 7:
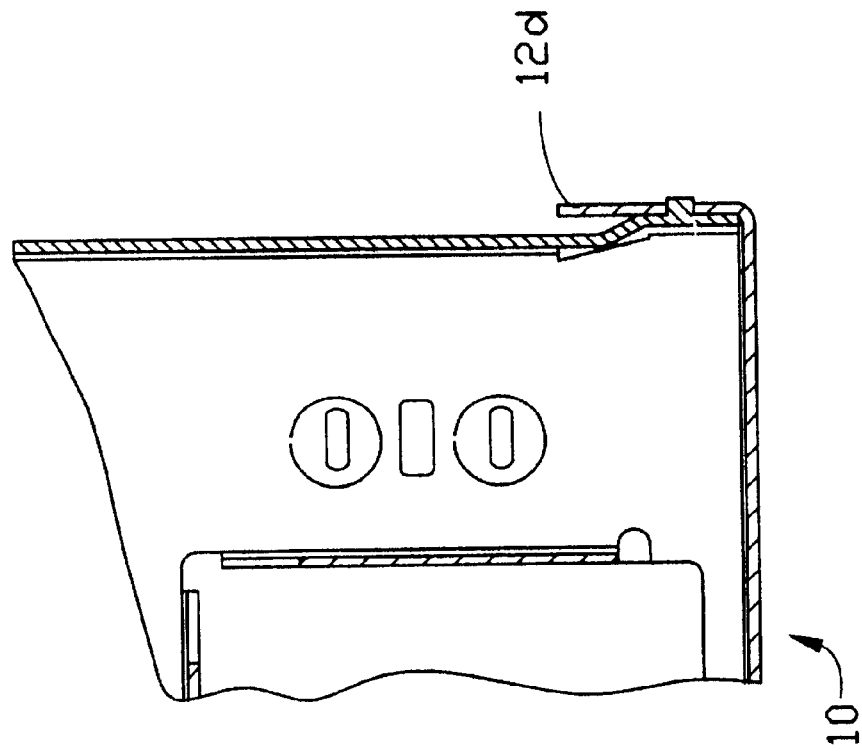
FIG. 7 is a cross sectional view taken along line 7—7 of FIG. 1.

Referring to FIGS. 1 to 9, a computer enclosure 1 for enclosing electrical devices therein in accordance with the present invention generally comprises a chassis 10 having a bottom panel 11 and a pair of side panels 12. A cover 20 is. detachably assembled to the chassis 10 and includes a top panel 21 and a pair of side panels 22 corresponding to the side panels 12 of the chassis 10. The side panel 12 includes a cutout 12a forming a reduced height portion 12b of the side panel. The reduced height portion 12b includes a recessed portion 12c defining a space and a planar portion 12d.

Interlatching means 30 formed between the chassis 10 and cover 20 for detachably attaching the cover 20 to the chassis 10 includes a spring latch 31 extending downward and outward from the side wall 12 of the chassis 10. The spring latch 31 includes a first portion 31a extended downward from the side panel of the chassis 10, a second portion 31b extends downward and outward from the first portion 31a, and a third portion 31c extends downward from the second portion 31b. The third portion 31c extends into the cutout 12a. The third portion 31c is in parallel but offset to the first portion 31a. In addition, for a better engaging effect, the third portion 31c of the spring latch 31 extends beyond a plane (not labeled) defined by the side panel 12 of the chassis 10.

According to the preferred embodiment, the chassis 10 includes a rear panel 13 having a wing 13a folded to be parallel to the side panel 12 of said chassis 10. The wing 13a is arranged such that there is a distance (not labeled) to the side panel 12. This can be easily understood that there is a slant junction 13b between the reduced height portion 12b and the wing 13a. On the other hand, the spring latch 31 is originated from the wing 13a of the rear panel 13.

The interlatching means 30 includes latch plates 32 embossed from the side panels 22 of the cover 20 corresponding to the spring latches 31. The latch plates 32 are received in the receiving space 12c and interlocked with a free end 31d of the third portion 31c of the spring latch 31 when the cover 20 is assembled to the chassis 10. As mentioned above, the third portion 31c extends beyond the plane defined by the side panel 12 of the chassis 10, when the cover 20 is assembled to the chassis 10, the free end 31d abuts against an upper edge 32a of the latch plate 32 after the spring latch 31 slides over the latch plate 32. This arrangement benefits reliable and effective interlock between the cover 20 and the chassis 10.

The side panel 22 of the cover 20 further includes a hook 23 corresponding to the planar portion 12d of the reduced height portion 12b. When the cover 20 is assembled to the chassis 10, the hook 23 will be engagingly received in a space between the planar portion 12d of the reduced height portion 12b and the wing of the rear panel such that the side panel 22 of the cover 20 is unlikely to be pried from the side panel 12 of the chassis 10. As it can be readily appreciated that the planar portion 12d is adjacent to the rear panel 13 of the chassis 10, the engagement of the hook 23 of the cover 20 and the planar portion 12d on the chassis 10 ensures close contact between the side panel 22 of the cover 20 and the side panel 12 of the chassis 10.

The interlocking means 30 further includes a release button 34 in the side panel 22 of the cover 20. The release button 34 is cantilevered from the side panel 22 of the cover 20 by a leaf member 34a. The button 34 is arranged such that it can be pushed inward from outside of the side panel 22.

In order to disconnect the engagement between the spring latch 31 of the chassis 10 and the latch plate 32 on the cover 22, the release button 34 is pushed inward from outside of the cover 20 such that the free end 31d of the third portion 31c of the spring latch 31 is pushed away from the upper edge 32a of the latch plate 32 by the leaf member 34a. As a result, the cover 20 is free of being lifted upward thereby separating from the chassis 10 thereby providing an access to the components and devices carried in the chassis 10.

Providing a recessed portion 21c on the reduced height portion 12b to receive the latch plate 32 is very beneficial since the side panel 12 of the chassis 10 and the side panel 22 of the cover 20 can be closely arranged to such that the EMI leakage therebetween can be effectively reduced. This is not approachable by the existing prior arts.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

We claim:

1. A computer enclosure for enclosing electrical devices therein, comprising:
    a chassis having a bottom panel and a pair of side panels at least one of said side panels including a cutout forming a reduced height portion adjacent to a rear panel thereof, said rear panel including a wing fixedly attached to said reduced height portion, said wing being parallel to said at least one side panel, said reduced height portion defining a recessed portion therein;
    a spring latch extended downward and outward from said wing portion of said rear panel to a position corresponding to said cutout;
    a cover detachably assembled to said chassis having a top panel and a pair of side panels corresponding to said side panels of said chassis, said cover including a latch plate received in said recessed portion and engaged with said spring latch when said cover is assembled to said chassis, said cover further including a hook engagingly received in a space defined between a planar portion of said reduced height portion beside said recessed portion and said wing of said rear panel when said cover is assembled to said chassis.

2. The computer enclosure as recited in claim 1, wherein said cover further includes a release button accessible to push said spring latch inward to disconnect engagement between said spring latch and said latch plate.

3. The computer enclosure as recited in claim 1, wherein said spring latch includes a first portion extended downward from the rear panel of said chassis, a second portion extended downward and outward from said first portion, and a third portion extending downward from said second portion.

4. The computer enclosure as recited in claim 3, wherein said third portion extends beyond a plane defined by said at least one side panel of said chassis.

5. The computer enclosure as recited in claim 1, wherein said hook is formed very close to a front edge of a corresponding one of said side panels of said cover, thereby effectively preventing said cover from separating from said chassis when said hook and said reduced height portion are interlocked.

6. A computer enclosure for enclosing electrical devices therein, comprising:
    a chassis having a bottom panel and a pair of side panels at least one of said side panels including a cutout forming a reduced height portion adjacent to a rear panel thereof, said rear panel including a wing fixedly attached to said reduced height portion, said wing being parallel to said at least one panel, said reduced height portion defining a recessed portion and a planar portion beside said recessed portion therein;
    a spring latch extended downward and outward from said wing portion of said rear panel to a position corresponding to said cutout;
    a cover detachably assembled to said chassis having a top panel and a pair of side panels corresponding to said side panels of said chassis, said cover including a latch plate received in said recessed portion and engaged with said spring latch, and a hook interlockedly received in a space between said planar portion of said reduced height portion and said wing of said rear panel when said cover is assembled to said chassis.

7. A computer enclosure comprising:
    a chassis including at least a first side panel;
    a cover positioned above the chassis and including at least a second side panel corresponding to said first side panel;
    said first side panel including a reduced height portion defining thereof an inwardly dented recessed portion which is directly stamped from the reduced height portion, and a planar portion beside said recessed portion;
    a spring latch being outwardly deflectable above the recessed portion with a free end at a bottom portion thereof;
    said second side panel including an inwardly dented latch plate, and a deflectable leaf member positioned above said latch plate; wherein
    when said cover is assembled to said chassis, said latch plate is received within a space defined by said recessed portion, and said spring latch abuts against a top portion of the latch plate.

8. The enclosure as recited in claim 7, wherein said cover further includes an inwardly projecting hook positioned beside the latch plate, and said hook is latchably engaged with an edge of the planar portion of the reduced height portion.

* * * * *